United States Patent
Teranishi

(10) Patent No.: US 9,584,315 B2
(45) Date of Patent: Feb. 28, 2017

(54) ORDER-PRESERVING ENCRYPTION SYSTEM, ENCRYPTION DEVICE, DECRYPTION DEVICE, ENCRYPTION METHOD, DECRYPTION METHOD, AND PROGRAMS THEREOF

(71) Applicant: NEC CORPORATION, Tokyo (JP)

(72) Inventor: Isamu Teranishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/412,475

(22) PCT Filed: Jul. 3, 2013

(86) PCT No.: PCT/JP2013/068278
§ 371 (c)(1),
(2) Date: Jan. 2, 2015

(87) PCT Pub. No.: WO2014/007296
PCT Pub. Date: Jan. 9, 2014

(65) Prior Publication Data
US 2015/0172044 A1 Jun. 18, 2015

(30) Foreign Application Priority Data
Jul. 4, 2012 (JP) ................. 2012-150166

(51) Int. Cl.
*H04L 29/00* (2006.01)
*H04L 9/08* (2006.01)
(Continued)

(52) U.S. Cl.
CPC ............ *H04L 9/0816* (2013.01); *G06F 21/60* (2013.01); *G06F 21/6227* (2013.01);
(Continued)

(58) Field of Classification Search
CPC ... H04L 9/28; H04L 9/30; H04L 63/04; G06F 2211/007; G06F 2211/008; G06F 2221/2107
(Continued)

(56) References Cited

U.S. PATENT DOCUMENTS

| | | | |
|---|---|---|---|
| 2005/0147240 A1* | 7/2005 | Agrawal ................. | G06F 21/60 380/28 |
| 2010/0146299 A1* | 6/2010 | Swaminathan ... | G06F 17/30666 713/189 |
| 2012/0121080 A1* | 5/2012 | Kerschbaum .......... | H04L 9/085 380/28 |

OTHER PUBLICATIONS

Xiao, Liangliang, and I. Yen. "Security analysis for order preserving encryption schemes." Information Sciences and Systems (CISS), 2012 46th Annual Conference on. IEEE, 2012.*
(Continued)

*Primary Examiner* — Madhuri Herzog
(74) *Attorney, Agent, or Firm* — Sughrue Mion, PLLC

(57) ABSTRACT

An encryption device comprises: a storage module for pre-storing an encryption key which is necessary for encryption processing; a pre-processing function unit which applies a pre-processing function to plaintext which converts an input value which in general may possibly not have a uniform distribution to an output value which has a uniform distribution; and an encryption unit which outputs encrypted text which is obtained by encrypting by order-preserving encryption, using the encryption key, the plaintext to which the pre-processing function is applied, and in which an order is maintained. This pre-processing function adds an arbitrarily selected random number to a value which is obtained by inputting an input value into a cumulative probability distribution function of an integer set with which the input value is associated, and treating same as an output value.

8 Claims, 3 Drawing Sheets

(51) Int. Cl.
*G06F 21/60* (2013.01)
*G06F 21/62* (2013.01)
*H04L 29/06* (2006.01)
*H04L 9/28* (2006.01)
*H04L 9/06* (2006.01)
*H04L 9/00* (2006.01)

(52) U.S. Cl.
CPC ............. *H04L 9/008* (2013.01); *H04L 9/06* (2013.01); *H04L 9/0869* (2013.01); *H04L 9/28* (2013.01); *H04L 63/04* (2013.01); *G06F 2211/007* (2013.01); *H04L 2209/08* (2013.01); *H04L 2209/24* (2013.01)

(58) Field of Classification Search
USPC ......... 380/259, 36–37, 28–30; 713/150–152, 713/164–167, 189–194
See application file for complete search history.

(56) References Cited

OTHER PUBLICATIONS

Yum, Dae Hyun, et al. "Order-preserving encryption for non-uniformly distributed plaintexts." Information Security Applications. Springer Berlin Heidelberg, 2011. 84-97.*

Agrawal, Rakesh, et al. "Order preserving encryption for numeric data." Proceedings of the 2004 ACM SIGMOD international conference on Management of data. ACM, 2004.*

Swaminathan, Ashwin, et al. "Confidentiality-preserving rank-ordered search." Proceedings of the 2007 ACM workshop on Storage security and survivability. ACM, 2007.*

Boldyreva et al., Order-Preserving Encryption Revisited: Improved Security Analysis and Alternative Solutions, pp. 1-36.

Boldyreva et al., Order- Preserving Symmetric Encryption, Georgia Institute of Technology, pp. 1-24.

* cited by examiner

ORDER-PRESERVING ENCRYPTION SYSTEM, ENCRYPTION DEVICE, DECRYPTION DEVICE, ENCRYPTION METHOD, DECRYPTION METHOD, AND PROGRAMS THEREOF

CROSS REFERENCE TO RELATED APPLICATIONS

This application is a National Stage of International Application No. PCT/JP2013/068278 filed Jul. 3, 2013, claiming priority based on Japanese Patent Application No. 2012-150166 filed Jul. 4, 2012, the contents of all of which are incorporated herein by reference in their entirely.

TECHNICAL FIELD

The present invention relates to an order-preserving encryption system, an encryption device, a decryption device, an encryption method, a decryption method, and programs thereof. More specifically, the present invention relates to an order-preserving encryption system and the like capable of encrypting plaintexts that may not necessarily be selected uniformly randomly from a plaintext space while maintaining the relative large-and-small relation thereof.

BACKGROUND ART

Because the basis of the work in enterprises and the like has been computerized, most of those enterprises have come to carry large-scaled databases for holding a vast amount of data used in the work. Such data are important data in terms of the work. Further, also in view of protecting personal information, the data must not be leaked to the outside. Thus, in such large-scaled databases, the data to be held therein are encrypted in many cases.

However, on the contrary, usefulness of the database systems may be lost by encrypting the stored data. For example, processing for comparing the size of the numerical data and rearranging each record in order thereof can be easily done in a database in which the data is not encrypted, and such processing is executed on a daily basis. However, such processing cannot be done in a state where each data is being encrypted.

Especially in an encrypted database (secure database) server in which many users register data encrypted by encryption keys of their own client devices, it is not possible to transmit the encryption keys also to the servers for the sake of management control. Further, even if the servers have decryption keys corresponding to the respective encryption keys, a vast amount of calculation processing is required only for decrypting each data. Thus, "to execute decryption processing on each data and then compare the sizes thereof" is not practically executable processing.

Due to the recent development of the so-called cloud computing technique, it is expected in the future that there will be more and more occasions where the users transmit the own data to the database servers connected via a network to have it managed there. Therefore, it is considered that the necessity for the technique for making it possible to compare the sizes of the data stored in the database while being encrypted will be increased more and more in the future.

A technique for enabling such requirement is order-presenting encryption which is depicted in Non-Patent Documents 1 to 2. In the order-preserving encryption, when two plaintexts m and m' is m<m', encrypted texts Enc(K, m) and Enc(K, m') acquired by encrypting each of those with a same encryption key also satisfies Enc(K, m)<Enc(K, m'). Therefore, through checking the relation between Enc(K, m) and Enc(K, m') in terms of large-and-small relation thereof, it is possible to check the relation between the plaintexts m and m' in terms of the large-and-small relation without decrypting each of those encrypted texts.

As other technical documents related thereto, there are each of following patent documents. Among those, depicted in Patent Document 1 is a bulletin board device which specifies the user who has proposed the intended largest or smallest value in electronic bidding and the like and the intended value, and keeps other confidentiality. Depicted in Patent 2 is an encryption device which expands and replaces divided plaintext data to the same size as that of the encryption key with a specific function before execution of nonlinear encryption processing.

Depicted in Patent Document 3 is a random sequence generation device used in a propagation model simulation of mobile communication and the like, which is capable of generating random numbers in accordance with specific probability distribution, standard deviation, and relative properties. Depicted in Patent 4 is a communication terminal which transmits/receives data in which a proper authentication code and a dummy authentication code are added to plaintext data. Depicted in Patent Document 5 is a device, a method, and the like for executing function calculation by secure circuit evaluation without disclosing original data.

Patent Document 1: Japanese Unexamined Patent Publication 2002-304287
Patent Document 2: Japanese Unexamined Patent Publication 2003-241656
Patent Document 3: Japanese Unexamined Patent Publication 2003-323292
Patent Document 4: Japanese Unexamined Patent Publication 2007-219157
Patent Document 5: Japanese Unexamined Patent Publication 2008-176193
Non-Patent Document 1: Alexsandra Boldyreva, Nathan Chenette, Younho Lee and Adam O'neill, Order-PreservingSymmetric Encryption, EUROCRYPT 2009. pp. 224-241.
Non-Patent Document 2: Alexsandra Boldyreva, Nathan Chenette, Adam O'neill. Order-Preserving EncryptionRevisited: Improved Security Analysis and Alternative Solutions. CRYPTO 2011: 578-595

Currently, there is no effective techniques found regarding the order-preserving encryption other than those depicted in Non-Patent Documents 1 to 2. With the order-preserving encryption depicted in Non-Patent Documents 1 to 2, it is the presupposition for achieving the technique that the numerical values of the plaintext as the target of encryption are "selected uniformly randomly from a plaintext space". In other cases, the safety of the encryption cannot be guaranteed.

However, in the actual world, the numerical values to be the target of encryption are not necessarily limited to be "uniformly random". For example, most of values such as human height, weight, annual income, results of academic examinations, and deviation values are distributed in a form close to a binomial distribution with respect to the average values thereof. In a case where such numerical values are taken as plaintexts, the techniques depicted in Non-Patent Documents 1 to 2 cannot be applied.

Patent Document 1 is designed to specify the maximum value and the minimum value among the encrypted numerical values. However, it is not designed to encrypt those while keeping the large-and-small relation thereof. Other Patent Documents 2 to 5 are different in object at the first place. Therefore, it is not possible to acquire the technique for making it possible to apply the technique of order-preserving encryption for the plaintexts that are "not necessarily uniformly random" even when the techniques depicted in Patent Documents 1 to 5 are combined with the techniques depicted in Non-Patent Documents 1 to 2.

It is therefore an object of the present invention to provide an order-preserving encryption system, an encryption device, a decryption device, an encryption method, a decryption method, and programs thereof capable of encrypting plaintexts while maintaining the relative large-and-small relation thereof even when numerical values that are "not necessarily uniformly random" are taken as the plaintexts.

DISCLOSURE OF THE INVENTION

In order to achieve the foregoing object, the order-preserving encryption system according to the present invention is a system which is characterized to include: an encryption device which encrypts an inputted plaintext and outputs an encrypted text; and a decryption device which decrypts the inputted encrypted text and outputs the plaintext, wherein the encryption device includes: a storage module which stores in advance an encryption key required for encryption processing; a pre-processing function unit which applies, on the plaintext, a pre-processing function for converting input values that may not generally be distributed uniformly to output values distributed uniformly; and an encryption unit which outputs the encrypted text that is acquired by encrypting the plaintext on which the pre-processing function is applied with order-preserving encryption by using the encryption key while maintaining a large-and-small relation.

In order to achieve the foregoing object, the encryption device according to the present invention is an encryption device which encrypts an inputted plaintext with order-preserving encryption and outputs an encrypted text, which is characterized to include: a storage module which stores in advance an encryption key required for encryption processing; a pre-processing function unit which applies, on the plaintext, a pre-processing function for converting input values that may not generally be distributed uniformly to output values distributed uniformly; and an encryption unit which outputs the encrypted text that is acquired by encrypting the plaintext on which the pre-processing function is applied with order-preserving encryption by using the encryption key while maintaining a large-and-small relation.

In order to achieve the foregoing object, the decryption device according to the present invention is a decryption device which decrypts an inputted encrypted text with order-preserving encryption and outputs a plaintext, which is characterized to include: a storage module which stores in advance a decryption key required for decryption processing; a decryption unit which decrypts the encrypted text with the order-preserving encryption by using the decryption key while maintaining a large-and-small relation; and a post-processing function unit which takes an output from the decryption unit as the input value and outputs, as the plaintext, the output value that is acquired by applying an inverse function for converting it to an output value that may not generally be distributed uniformly.

In order to achieve the foregoing object, the order-preserving encryption method according to the present invention is used in an order-preserving encryption system which includes: an encryption device which encrypts an inputted plaintext and outputs an encrypted text; and a decryption device which decrypts the inputted encrypted text and outputs the plaintext, wherein: an encryption key required for encryption processing is stored in a storage module that is provided to the encryption device in advance; a pre-processing function unit of the encryption device applies, on the plaintext, a pre-processing function for converting input values that may not generally be distributed uniformly to output values distributed uniformly; an encryption unit of the encryption device encrypts the plaintext on which the pre-processing function is applied with order-preserving encryption by using the encryption key while maintaining a large-and-small relation; and the encryption unit of the encryption device outputs the encrypted text that is acquired by the encryption.

In order to achieve the foregoing object, the order-preserving decryption method according to the present invention is used in an order-preserving encryption system which includes: an encryption device which encrypts an inputted plaintext and outputs an encrypted text; and a decryption device which decrypts the inputted encrypted text and outputs the plaintext, wherein: a decryption key required for decryption processing is stored in a storage module that is provided to the decryption device in advance; a decryption unit of the decryption device decrypts the encrypted text with order-preserving encryption by using the decryption key while maintaining a large-and-small relation; by taking an output from the decryption unit as the input value, a post-processing function unit of the decryption device applies an inverse function for converting it to an output value that may not generally be distributed uniformly; and the post-processing function unit of the decryption device outputs the output value acquired by the inverse function as the plaintext.

In order to achieve the foregoing object, the order-preserving encryption program according to the present invention is used in an order-preserving encryption system which includes: an encryption device which encrypts an inputted plaintext and outputs an encrypted text; and a decryption device which decrypts the inputted encrypted text and outputs the plaintext, wherein an encryption key required for encryption processing is stored in a storage module that is provided to the encryption device in advance, the program causing a processor provided to the encryption device to execute: a procedure for applying, on the plaintext, a pre-processing function for converting input values that may not generally be distributed uniformly to output values distributed uniformly; a procedure for encrypting the plaintext on which the pre-processing function is applied with order-preserving encryption by using the encryption key while maintaining a large-and-small relation; and a procedure for outputting the encrypted text that is acquired by the encryption.

In order to achieve the foregoing object, the order-preserving decryption program according to the present invention is used in an order-preserving encryption system which includes: an encryption device which encrypts an inputted plaintext and outputs an encrypted text; and a decryption device which decrypts the inputted encrypted text and outputs the plaintext, wherein a decryption key required for decryption processing is stored in a storage module that is provided to the decryption device in advance, the program causing a processor provided to the decryption device to execute: a procedure for decrypting the encrypted text with order-preserving encryption by using the decryption key while maintaining a large-and-small relation; a procedure for taking an output from the decryption unit as the input value, and applying an inverse function for converting it to an output value that may not generally be distributed uniformly; and a procedure for outputting the output value acquired by the inverse function as the plaintext.

As described above, the present invention is structured to apply a pre-processing function on the plaintexts for converting the input values that may not be distributed uniformly to the output values distributed uniformly and to encrypt the values thereafter. Thus, it is possible to provide the excellent order-preserving encryption system, encryption device, decryption device, encryption method, decryption method, and programs thereof, which are capable of encrypting plaintexts while maintaining the relative large-and-small relation thereof even when numerical values that are "not necessarily uniformly random" are taken as the plaintexts.

Figure 1:
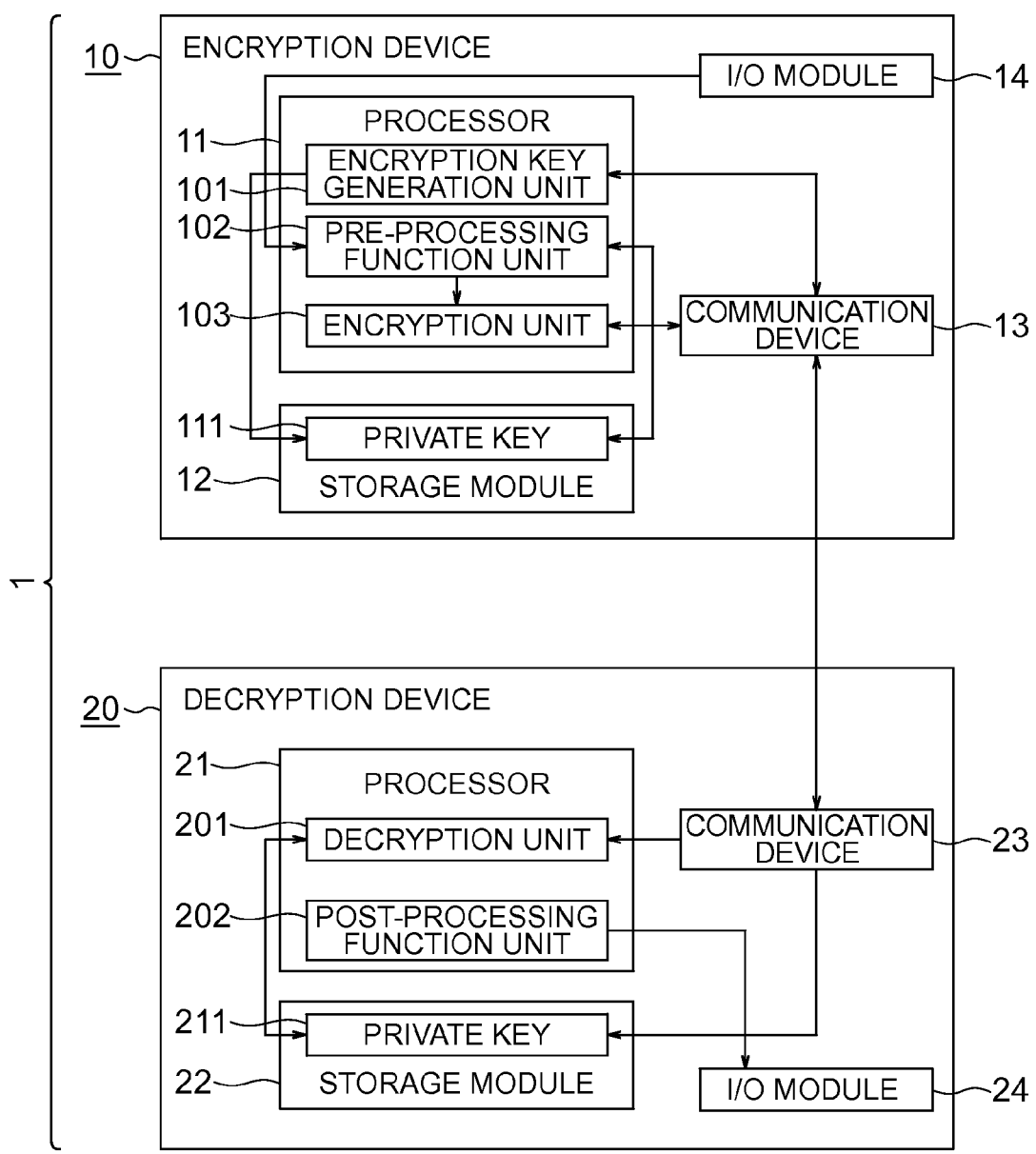
FIG. 1 is an explanatory chart showing the structure of an order-preserving encryption system according to an embodiment of the present invention.

BEST MODES FOR CARRYING OUT THE INVENTION (Embodiment)
Hereinafter, the structure of an embodiment of the present invention will be described by referring to the accompanying drawing FIG. 1.

Basic contents of the embodiment will be described first, and more specific contents thereof will be described thereafter.

An order-preserving encryption system 1 according to the embodiment is an order-preserving encryption system constituted with: an encryption device 10 which encrypts an inputted plaintext and outputs an encrypted text; and a decryption device 20 which decrypts the inputted encrypted text and outputs the plaintext. The encryption device 10 includes: a storage module 12 which stores in advance an encryption key (private key 111) required for encryption processing; a pre-processing function unit 102 which applies a pre-processing function on a plaintext for converting input values that may not generally be distributed uniformly into output values that are distributed uniformly; and an encryption unit 103 which outputs an encrypted text that is acquired by encrypting a plaintext on which the pre-processing function is applied with order-preserving encryption by using the encryption key while maintaining the large-and-small relation. Further, the pre-processing function is defined to add a random number selected arbitrarily to a value acquired by inputting an input value to an cumulative probability distribution function of an integer set to which the input value belongs, and to take it as an output value.

The decryption device 20 includes: a storage module 22 which stores in advance a decryption key (public key 211) corresponding to the encryption key; a decryption unit 201 which decrypts the encrypted text with the order-preserving encryption by using the decryption key while maintaining the large-and-small relation; and a post-processing function unit 202 which takes the output from the decryption unit as the input value and outputs, as the plain text, the output value acquired by applying an inverse function of the pre-processing function thereto. Further, the inverse function is defined to take, as the output value, the maximum numerical value with which the value acquired by inputting a specific numerical value to the cumulative probability distribution function becomes equal to or larger than the input value.

Through having the above-described structure, the order-preserving encryption system 1 becomes capable of performing encryption while maintaining the large-and-small relation even when the numerical values that are "not necessarily uniformly random" are taken as the plaintexts.

Hereinafter, this will be described in more details.

FIG. 1 is an explanatory chart showing the structure of the order-preserving encryption system 1 according to the embodiment of the present invention. The order-preserving encryption system 1 is constituted with: the encryption device 10 which encrypts a plaintext and outputs an encrypted text; and the decryption device 20 which decrypts the encrypted text and outputs the plaintext.

The encryption device 10 includes the structures as a typical computer device. That is, the encryption device 10 includes: a processor 11 as the main unit for executing computer programs; a storage module 12 for storing data; a communication module 13 which executes data communication with other computers; and an I/O module 14 which accepts input from a user and presents the arithmetic calculation result to the user.

The decryption device 20 also includes the structures as a typical computer device. That is, the decryption device 20 includes a processor 21, a storage module 22, a communication module 23, and an I/O module 24, which are same as those of the encryption device 10, respectively.

The processor 11 of the encryption device 10 functions as an encryption key generation unit 101, a pre-processing function unit 102, and an encryption unit 103 through operations of an order-preserving encryption program. Further, the processor 21 of the decryption device 20 operates as a decryption unit 201 and a post-processing function unit 202 through operations of an order-preserving decryption program.

The encryption key generation unit 101 generates the encryption key used in the order-preserving encryption system 1. This encryption key is of a private key encryption method. The private key 111 is stored in the storage module 12 of the encryption device 10, and the public key 211 corresponding thereto is stored in the storage module 22 of the decryption device 20. Such structure avoids disclosure of the private key to the outside of the encryption device 20, thereby making it possible to build the order-preserving encryption system 1 while keeping the security.

In the order-preserving encryption system 1 shown in FIG. 1, the encryption deice 10 is provided with the encryption key generation unit 101. However, it is possible to change such structure to the structure in which the decryption device 20 is provided with an encryption key generation unit, the decryption device 20 carries a private key, and the encryption device 10 carries a public key, respectively. Further, a same computer device may be used as the encryption device 10 and the decryption device 20.

It is also fine to employ a structure in which a computer different from both the encryption device 10 and the decryption device 20 is provided with the encryption key generation unit, as long as the problem in terms of the security regarding delivery of the encryption key can be overcome. Further, the encryption key may not be of the private key encryption method but of a common key encryption method.

In the embodiment, the plaintext m is an integer. The pre-processing function unit 102 applies a function Func to be described later to the plaintext m inputted from the I/O module 14 and outputs x=Func(m). The encryption unit 103 encrypts the outputted x by using the private key 111=K with the order-preserving encryption technique depicted in Non-Patent Documents 1 to 2, and outputs calculated C=Enc(K, x) as an encrypted text.

The decryption unit 201 decrypts the encrypted text C that is encrypted by the encryption device 10 by using the public key 211=K' with the above-described order-preserving encryption technique, and outputs calculated x=Dec(K', C). The post-processing function unit 202 applies Inv that is an inverse function of the function Func to x outputted from the decryption unit 201, and outputs calculated m=Inv(x) as the original plaintext.

Figure 2:
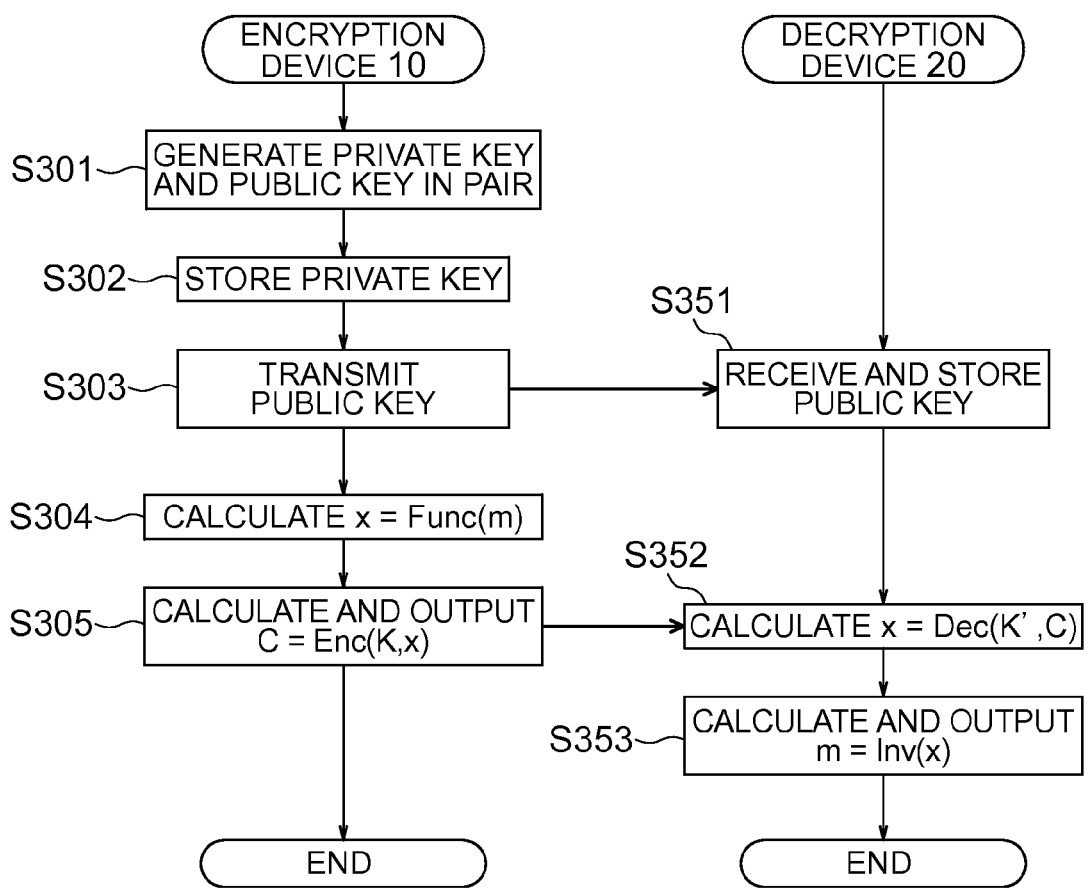
FIG. 2 is a flowchart showing actions of the order-preserving encryption system shown in FIG. 1.

FIG. 2 is a flowchart showing actions of the order-preserving encryption system 1 shown in FIG. 1. First, the encryption key generation unit 101 generates the private key 111 and the public key 211 as a pair (step S301), and stores the private key 111 in the storage module 12 of the encryption device 10 (step S302). Further, the public key 211 is given to the decryption device 20 via the communication module 13 (step S303). The decryption device 20 receives it via the communication module 23, and stores it in the storage module 22 (step S351).

On condition of the above, when the plaintext m is inputted to the encryption device 10 via the I/O module 14, the pre-processing function unit 102 applies the function Func to the plaintext m and outputs x=Func(m) (step S304). Further, the encryption unit 103 encrypts the outputted x by using the private key 111=K and outputs calculated C=Enc (K, x) as an encrypted text (step S305).

The outputted encrypted text C is inputted to the decryption device 20 via the communication modules 13 and 23 or via the I/O module 24. When this encrypted text C is inputted, the decryption unit 201 decrypts it by using the public key 211=K' and outputs calculated x=Dec(K', C) (step S352). Then, the post-processing function unit 202 applies the inverse function Inv to the outputted x and outputs calculated m=Inv(x) as the original plaintext via the I/O module 24 (step S353).

(Function Func)

The function Func and the inverse function Inv thereof will be described. The function Func is a function in which Func(m) takes uniformly distributed values even for the plaintext m that may not generally be distributed uniformly such as a normal distribution.

An example of the function satisfying such condition is shown. A specific set of integers is defined as M (m∈M), and a probability function f[P](m) is defined as shown in following Expression 1 for the probability distribution P on the set M. Further, for the probability function f[P](m), a cumulative distribution function F[P](m) is defined as shown in following Expression 2. It is desirable for f[P](m) and F[P](m) to be functions that can be calculated efficiently.

$$f[P](m) = (\text{Probability for random number } r \text{ selected according to } P \text{ to satisfy } r=m) \quad \text{(Expression 1)}$$

$$F[P](m) = (\text{Probability for random number } r \text{ selected according to } P \text{ to satisfy } r \leq m) \quad \text{(Expression 2)}$$

Here, the probability distribution P on M that satisfies the characteristics shown in following Expression 3 is defined. Specifically, the characteristics are satisfied for N=2^n when M is defined as a set {1, . . . , n} and P as a binomial distribution B(n, ½), for example. Note here that "the B-th power of A" is expressed as "A^B" in lines other than numerical expressions in the current Description.

$$F[P](m) \neq F[P](m') \text{ for arbitrary } m, m' \in M \text{ satisfying } m \neq m'$$

$$N \times F[P](m) \text{ is integer for all } m, \text{ when integer } N \text{ exists} \quad \text{(Expression 3)}$$

For this probability distribution P, x=Func(m) can be defined as shown in following Expression 4.

Select random number r from set {1, . . . , N× F[P](m)}

Output $x = F[P](m-1) + r$ (Expression 4)

Further, m=Inv(x) as the inverse function thereof can be defined as shown in following Expression 5.

Output maximum m that satisfies $x > F[P](m-1)$ (Expression 5)

Figure 3:
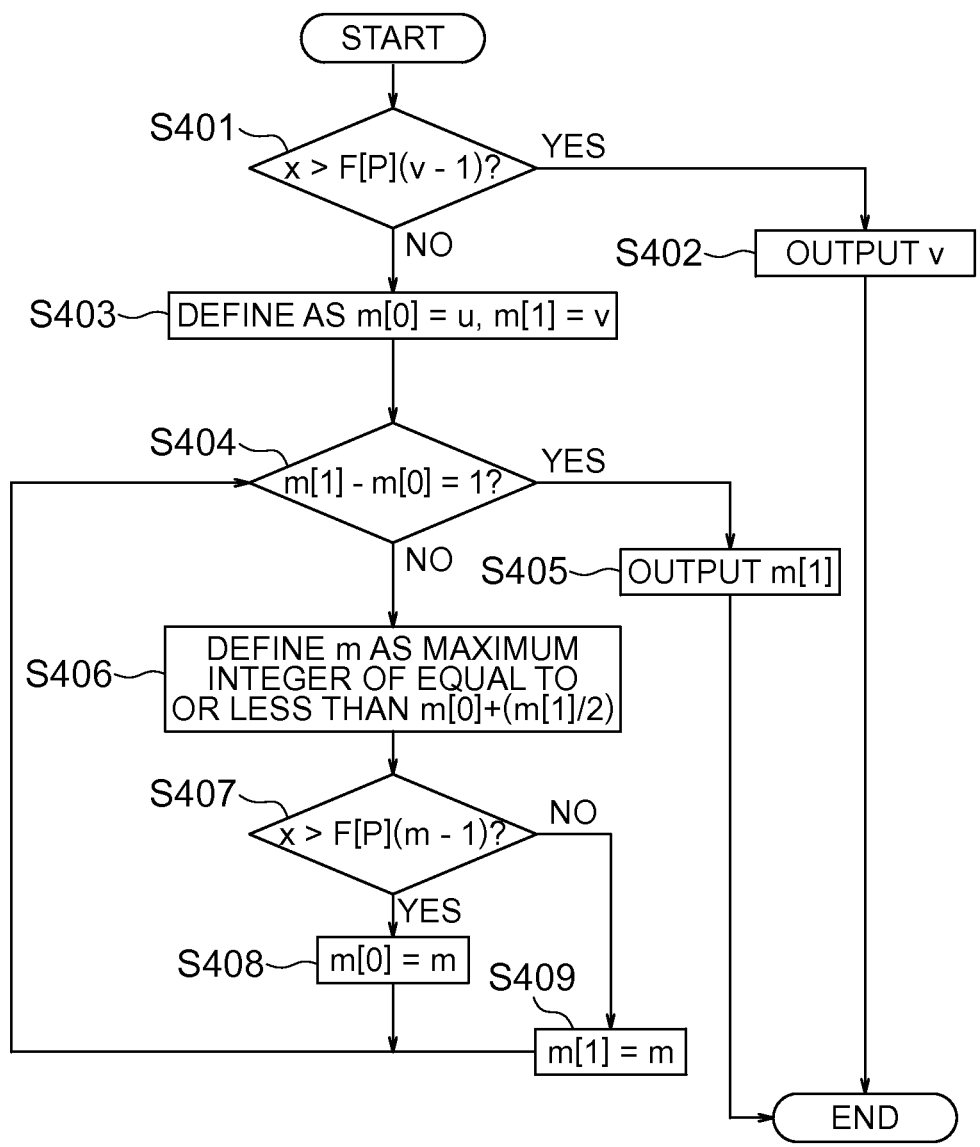
FIG. 3 is a flowchart showing an example of a calculation method of inverse function m=Inv(x) shown as step S353 of FIG. 2.

FIG. 3 is a flowchart showing an example of a calculation method of the inverse function m=Inv(x) shown as step S353 of FIG. 2. This m=Inv(x) can be easily calculated by dichotomy shown in FIG. 3. However, it is assumed that the plaintext space M is an interval {u, . . . , v}.

First, the post-processing function unit 202 judges whether or not x>F[P](v−1) is satisfied (step S401), takes v as the output value when judged as x>F[P](v−1), and ends the processing (step S402). When x>F[P](v−1) is not satisfied, m[0]=u and m[1]=v are defined, respectively (step S403), and it is judged whether or not m[1]−m[0]=1 is satisfied (step S404).

When judged that m[1]−m[0]=1 is satisfied in step S403, m[1] is taken as the output value and the processing is ended (step S405). When judged that m[1]−m[0]=1 is not satisfied, m is defined as the maximum integer of equal to or smaller than m[0]+m[1]/2 (step S406) and it is judged whether or not x>F[P](m−1) is satisfied (step S407).

When judged that x>F[P](m−1) is satisfied in step S407, m[0]=m is defined and the procedure is returned to step S404 (step S408). When judged that x>F[P](m−1) is not satisfied, m[1]=m is defined and the procedure is returned to step S404 (step S409).

(Overall Actions of Embodiment)

Next, the overall actions of the above-described embodiment will be described.

The encryption method according to the embodiment is used in the order-preserving encryption system 1 constituted with: the encryption device 10 which encrypts an inputted plaintext and outputs the encrypted text; and the decryption device 20 which decrypts the inputted encrypted text and outputs the plaintext. With the encryption method, an encryption key required for encryption processing is stored in the storage module that is provided in advance to the encryption device, the pre-processing function unit of the encryption device applies, on the plaintext, re-processing function for converting the input values that may not generally be distributed uniformly to the output values distributed uniformly (FIG. 2: step S304), the encryption unit of the encryption device encrypts the plaintext on which the pre-processing function is applied with the order-preserving encryption by using the encryption key, and the encryption unit of the encryption device outputs the encrypted text acquired by the encryption (FIG. 2: step S305).

Further, the decryption method according to the embodiment is used in the order-preserving encryption system 1 constituted with: the encryption device 10 which encrypts an inputted plaintext and outputs the encrypted text; and the decryption device 20 which decrypts the inputted encrypted text and outputs the plaintext. With the decryption method, a decryption key required for decryption processing is stored in the storage module that is provided in advance to the decryption device, the decryption unit of the decryption device decrypts the encrypted text with the order-preserving encryption by using the decryption key (FIG. 2: step S352), the post-processing function unit of the decryption device applies the inverse function for converting the input values that are output of the decryption unit to the output values that may not generally be distributed uniformly to the output values distributed uniformly, and the post-processing function unit of the decryption device outputs the output values acquired by the inverse function as the plaintexts (FIG. 2: step S353).

Note here that each of the above-described steps may be put into programs to be executed by a computer, and each of the steps may be executed by the processor 11 of the encryption device and the processor 21 of the decryption device, which directly execute each of those steps. The program may be recorded on a non-transitory recording medium such as a DVD, a CD, a flash memory, or the like. In that case, the program is read out from the recording medium and executed by the computer.

Through such actions, the embodiment can provide following effects.

The embodiment can redeem such shortcoming of the order-preserving encryption depicted in Non-Patent Documents 1 to 2 that it cannot be applied to the plaintexts that are "not necessarily uniformly random" and can execute the encryption processing while maintaining the large-and-small relation even when such numerical values are taken as the plaintexts. Therefore, it is possible to execute the processing based on the comparison of the size of the numerical value data and the result thereof particularly in the above-described encryption database server. As described above, this processing is executed daily in the databases in which the data is not encrypted, so that the convenience for using the encryption database server can be improved greatly.

(Expansion of Embodiment)

The embodiment described above can be expanded variously within a scope with which the spirit of the present invention described above is not altered. This will be described hereinafter. First, as described above, while the order-preserving encryption system 1 in which the encryption device 10 is provided with the encryption key generation unit 101 is described, it is possible to change the structure in which the decryption device 20 includes the encryption key generation unit, the decryption device 20 carries the private key, and the encryption device 10 carries the public key, respectively.

Further, the encryption device 10 and the decryption device 20 may be a same computer device. In such case, the encryption key may be not of the private key encryption method but of the common key encryption method.

Further, in the embodiment, the plaintext m is defined as an integer. However, other than integers, it is also possible to employ the method of the embodiment for numerical values as long as those capable of making comparison.

Further, as long as the problems in terms of the security regarding delivery of the encryption key can be overcome (e.g., encryption is performed further on the encryption key with another encryption key, the encryption key is delivered via a management-only network different from the Internet, the encryption key is stored in a storage medium and carried or mailed), it is also fine to employ a structure in which a computer different from both the encryption device 10 and the decryption device 20 is provided with the encryption key generation unit.

While the present invention has been described above by referring to the specific embodiment shown in the drawings, the present invention is not limited only to the embodiment described above. Any other known structures can be employed, as long as the effects of the present invention can be achieved therewith.

Regarding the embodiment described above, the new technical contents thereof can be summarized as follows. While a part of or a whole part of the embodiment can be summarized as follows as the new techniques, the present invention is not necessarily limited only to the followings.

(Supplementary Note 1)

An order-preserving encryption system which includes: an encryption device which encrypts an inputted plaintext and outputs an encrypted text; and a decryption device which decrypts the inputted encrypted text and outputs the plaintext, wherein the encryption device includes:
    a storage module which stores in advance an encryption key required for encryption processing;
    a pre-processing function unit which applies, on the plaintext, a pre-processing function for converting input values that may not generally be distributed uniformly to output values distributed uniformly; and
    an encryption unit which outputs the encrypted text that is acquired by encrypting the plaintext on which the pre-processing function is applied with order-preserving encryption by using the encryption key.

(Supplementary Note 2)

The order-preserving encryption system as depicted in Supplementary Note 1, wherein the pre-processing function adds an arbitrarily selected random number to a value acquired by inputting the input value to a cumulative probability distribution function of an integer set to which the input value belongs and takes it as the output value.

(Supplementary Note 3)

The order-preserving encryption system as depicted in Supplementary Note 1 or 2, wherein the decryption device includes:
    a storage module which stores in advance a decryption key that corresponds to the encryption key;
    a decryption unit which decrypts the encrypted text with the order-preserving encryption by using the decryption key; and
    a post-processing function unit which takes an output from the decryption unit as the input value, and outputs an output value acquired by applying an inverse function of the pre-processing function thereto as the plaintext.

(Supplementary Note 4)

The order-preserving encryption system as depicted in Supplementary Note 3, wherein the inverse function takes, as the output value, a maximum value out of specific numerical values with which a value acquired by inputting the specific numerical value to the cumulative probability distribution function becomes equal to or larger than the input value.

(Supplementary Note 5)

An encryption device which encrypts an inputted plaintext with order-preserving encryption and outputs an encrypted text, and the device includes:

a storage module which stores in advance an encryption key required for encryption processing;

a pre-processing function unit which applies, on the plaintext, a pre-processing function for converting input values that may not generally be distributed uniformly to output values distributed uniformly; and an encryption unit which outputs the encrypted text that is acquired by encrypting the plaintext on which the pre-processing function is applied with order-preserving encryption by using the encryption key.

(Supplementary Note 6)

A decryption device which decrypts an inputted encrypted text with order-preserving encryption and outputs a plaintext, and the device includes:

a storage module which stores in advance a decryption key required for decryption processing;

a decryption unit which decrypts the encrypted text with the order-preserving encryption by using the decryption key; and a post-processing function unit which takes an output from the decryption unit as the input value and outputs, as the plaintext, the output value that is acquired by applying an inverse function for converting it to an output value that may not generally be distributed uniformly.

(Supplementary Note 7)

An encryption method used in an order-preserving encryption system which includes: an encryption device which encrypts an inputted plaintext and outputs an encrypted text; and a decryption device which decrypts the inputted encrypted text and outputs the plaintext, wherein:

an encryption key required for encryption processing is stored in a storage module that is provided to the encryption device in advance;

a pre-processing function unit of the encryption device applies, on the plaintext, a pre-processing function for converting input values that may not generally be distributed uniformly to output values distributed uniformly;

an encryption unit of the encryption device encrypts the plaintext on which the pre-processing function is applied with order-preserving encryption by using the encryption key; and the encryption unit of the encryption device outputs the encrypted text that is acquired by the encryption.

(Supplementary Note 8)

A decryption method used in an order-preserving encryption system which includes: an encryption device which encrypts an inputted plaintext and outputs an encrypted text; and a decryption device which decrypts the inputted encrypted text and outputs the plaintext, wherein:

a decryption key required for decryption processing is stored in a storage module that is provided to the decryption device in advance;

a decryption unit of the decryption device decrypts the encrypted text with order-preserving encryption by using the decryption key;

by taking an output from the decryption unit as the input value, a post-processing function unit of the decryption device applies an inverse function for converting it to an output value that may not generally be distributed uniformly; and the post-processing function unit of the decryption device outputs the output value acquired by the inverse function as the plaintext.

(Supplementary Note 9)

An encryption program used in an order-preserving encryption system which includes an encryption device which encrypts an inputted plaintext and outputs an encrypted text; and a decryption device which decrypts the inputted encrypted text and outputs the plaintext, wherein an encryption key required for encryption processing is stored in a storage module that is provided to the encryption device in advance, the program causing a processor provided to the encryption device to execute:

a procedure for applying, on the plaintext, a pre-processing function for converting input values that may not generally be distributed uniformly to output values distributed uniformly;

a procedure for encrypting the plaintext on which the pre-processing function is applied with order-preserving encryption by using the encryption key; and a procedure for outputting the encrypted text that is acquired by the encryption:

(Supplementary Note 10)

A decryption program used in an order-preserving encryption system which includes: an encryption device which encrypts an inputted plaintext and outputs an encrypted text; and a decryption device which decrypts the inputted encrypted text and outputs the plaintext, wherein a decryption key required for decryption processing is stored in a storage module that is provided to the decryption device in advance, the program causing a processor provided to the decryption device to execute:

a procedure for decrypting the encrypted text with order-preserving encryption by using the decryption key;

a procedure for taking an output from the decryption unit as the input value, and applying an inverse function for converting it to an output value that may not generally be distributed uniformly; and a procedure for outputting the output value acquired by the inverse function as the plaintext.

This Application claims the Priority right based on Japanese Patent Application No. 2012-150166 filed on Jul. 4, 2012 and the disclosure thereof is hereby incorporated by reference in its entirety.

INDUSTRIAL APPLICABILITY

The present invention can be applied to encryption database (secure database) servers. The present invention can be applied to any of the cases where the encryption device and the decryption device are physically a same device or different devices.

REFERENCE NUMERALS

1 Order-preserving encryption system
10 Encryption device
11, 21 Processor
12, 22 Storage module
13, 23 Communication module
14, 24 I/O module
20 Decryption device
101 Encryption key generation unit
102 Pre-processing function unit
103 Encryption unit
111 Private key
201 Decryption unit
202 Post-processing function unit
211 Public key

The invention claimed is:

1. An order-preserving encryption system, comprising:
an encryption device which encrypts an inputted plaintext and outputs an encrypted text; and a decryption device which decrypts the inputted encrypted text and outputs the plaintext, wherein the encryption device comprises:

a storage module which stores in advance an encryption key required for encryption processing;

a pre-processing function unit which applies, on the inputted plaintext, a pre-processing function to convert input values of the inputted plaintext that are not distributed uniformly to output values that are distributed uniformly, wherein the pre-processing function comprises of a cumulative probability distribution function; and an encryption unit which outputs the encrypted text that is acquired by encrypting the uniformly distributed output values obtained from the pre-processing function unit with order-preserving encryption by using the encryption key;

wherein the pre-processing function acquires an output value by adding an arbitrarily selected random number to a value acquired by inputting an input value of the inputted plaintext to the cumulative probability distribution function of an integer set to which the input value belongs.

2. The order-preserving encryption system as claimed in claim 1, wherein the decryption device comprises:

a storage module which stores in advance a decryption key that corresponds to the encryption key;

a decryption unit which decrypts the encrypted text with the order-preserving encryption by using the decryption key; and a post-processing function unit which applies an inverse of the pre-processing function to an output acquired from the decryption unit, wherein the inverse of the pre-processing function converts values that are uniformly distributed to plaintext values that are not necessarily uniformly distributed.

3. The order-preserving encryption system as claimed in claim 1, wherein the decryption device comprises:

a storage module which stores in advance a decryption key that corresponds to the encryption key;

a decryption unit which decrypts the encrypted text with the order-preserving encryption by using the decryption key; and a post-processing function unit which applies an inverse function of the pre-processing function to an output acquired from the decryption unit to obtain plaintext, wherein an output of the inverse function of the pre-processing function is a maximum value out of specific numerical values with which an output value of the cumulative probability distribution function becomes equal to or larger, wherein the output value of the cumulative probability distribution function is acquired by inputting the output acquired from the decryption unit to the cumulative probability distribution function.

4. An encryption device which encrypts an inputted plaintext with order-preserving encryption and outputs an encrypted text, comprising:

a storage module which stores in advance an encryption key required for encryption processing;

a pre-processing function unit which applies, on the inputted plaintext, a pre-processing function to convert input values of the inputted plaintext that are not distributed uniformly, wherein the pre-processing function comprises of a cumulative probability distribution function; and an encryption unit which outputs the encrypted text that is acquired by encrypting the uniformly distributed output values obtained from the pre-processing function unit with order-preserving encryption by using the encryption key;

wherein the pre-processing function acquires an output value by adding an arbitrarily selected random number to a value acquired by inputting an input value of the inputted plaintext to the cumulative probability distribution function of an integer set to which the input value belongs.

5. An encryption method used in an order-preserving encryption system which comprises:

an encryption device which encrypts an inputted plaintext and outputs an encrypted text; and a decryption device which decrypts the inputted encrypted text and outputs the plaintext, wherein:

an encryption key required for encryption processing is stored in a storage module that is provided to the encryption device in advance;

a pre-processing function unit of the encryption device applies, on the inputted plaintext, a pre-processing function to convert input values of the inputted plaintext that are not distributed uniformly to output values that are distributed uniformly, wherein the pre-processing function comprises of a cumulative probability distribution function;

an encryption unit of the encryption device encrypts the uniformly distributed output values obtained from the pre-processing function unit with order-preserving encryption by using the encryption key; and the encryption unit of the encryption device outputs the encrypted text that is acquired by the encryption;

wherein the pre-processing function acquires an output value by adding an arbitrarily selected random number to a value acquired by inputting an input value of the inputted plaintext to the cumulative probability distribution function of an integer set to which the input value belongs.

6. A non-transitory computer readable recording medium storing an encryption program used in an order-preserving encryption system which comprises:

an encryption device which encrypts an inputted plaintext and outputs an encrypted text; and a decryption device which decrypts the inputted encrypted text and outputs the plaintext, wherein an encryption key required for encryption processing is stored in a storage module that is provided to the encryption device in advance, the program causing a processor provided to the encryption device to execute:

a procedure that applies, on the plaintext, a pre-processing function to convert input values of the inputted plaintext that are not distributed uniformly to output values that are distributed uniformly, wherein the pre-processing function comprises of a cumulative probability distribution function;

a procedure that encrypts the uniformly distributed output values obtained from the pre-processing function unit with order-preserving encryption by using the encryption key; and a procedure that outputs the encrypted text that is acquired by the encryption;

wherein the pre-processing function acquires an output value by adding an arbitrarily selected random number to a value acquired by inputting an input value of the inputted plaintext to the cumulative probability distribution function of an integer set to which the input value belongs.

7. An order-preserving encryption system, comprising:
an encryption device which encrypts an inputted plaintext and outputs an encrypted text; and
a decryption device which decrypts the inputted encrypted text and outputs the plaintext,
wherein the encryption device comprises:
storage means for storing in advance an encryption key required for encryption processing;
pre-processing function means for applying, on the inputted plaintext, a pre-processing function to convert input values of the inputted plaintext that are not distributed uniformly to output values that are distributed uniformly, wherein the pre-processing function comprises of a cumulative probability distribution function; and
encryption means for outputting the encrypted text that is acquired by encrypting the uniformly distributed output values obtained from the pre-processing function unit with order-preserving encryption by using the encryption key;
wherein the pre-processing function means acquires an output value by adding an arbitrarily selected random number to a value acquired by inputting an input value of the inputted plaintext to the cumulative probability distribution function of an integer set to which the input value belongs.

8. An encryption device which encrypts an inputted plaintext with order-preserving encryption and outputs an encrypted text, comprising:
storage means for storing in advance an encryption key required for encryption processing;
pre-processing function means for applying, on the inputted plaintext, a pre-processing function to convert input values of the inputted plaintext that are not distributed uniformly to output values that are distributed uniformly, wherein the pre-processing function comprises of a cumulative probability distribution function; and
encryption means for outputting the encrypted text that is acquired by encrypting the uniformly distributed output values obtained from the pre-processing function unit with order-preserving encryption by using the encryption key;
wherein the pre-processing function means acquires an output value by adding an arbitrarily selected random number to a value acquired by inputting an input value of the inputted plaintext to the cumulative probability distribution function of an integer set to which the input value belongs.

* * * * *